United States Patent
Faruque et al.

(10) Patent No.: US 10,252,751 B2
(45) Date of Patent: Apr. 9, 2019

(54) INFLATABLE TUNNEL REINFORCEMENT

(71) Applicant: Ford Global Technologies, LLC, Dearborn, MI (US)

(72) Inventors: Mohammed Omar Faruque, Ann Arbor, MI (US); Yijung Chen, Ypsilanti, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 95 days.

(21) Appl. No.: 15/451,986

(22) Filed: Mar. 7, 2017

(65) Prior Publication Data
US 2018/0257713 A1  Sep. 13, 2018

(51) Int. Cl.
| | |
|---|---|
| *B62D 21/15* | (2006.01) |
| *B62D 27/02* | (2006.01) |
| *B62D 25/20* | (2006.01) |
| *B60K 17/28* | (2006.01) |
| *B60R 21/013* | (2006.01) |
| *B60R 21/00* | (2006.01) |

(52) U.S. Cl.
CPC ............ *B62D 21/157* (2013.01); *B60K 17/28* (2013.01); *B60R 21/00* (2013.01); *B60R 21/013* (2013.01); *B62D 25/20* (2013.01); *B62D 27/02* (2013.01); *B62D 27/026* (2013.01); *B60R 2021/0006* (2013.01)

(58) Field of Classification Search
CPC ..... B62D 21/157; B62D 25/20; B62D 21/155
See application file for complete search history.

(56) References Cited

U.S. PATENT DOCUMENTS

| | | | | |
|---|---|---|---|---|
| 4,178,015 A | * | 12/1979 | Merriman | F16F 9/0418 267/64.27 |
| 5,082,326 A | * | 1/1992 | Sekido | B60N 2/914 297/284.6 |
| 7,503,089 B2 | * | 3/2009 | Muhl | B65G 69/2817 14/69.5 |
| 7,823,964 B2 | * | 11/2010 | Tasumi | B62D 21/157 296/204 |
| 8,002,312 B2 | * | 8/2011 | Korechika | B60R 21/02 180/274 |
| 9,126,510 B2 | * | 9/2015 | Hirako | B60N 2/42763 |
| 9,327,666 B2 | * | 5/2016 | Sassi | B60R 21/0136 |
| 9,394,005 B1 | * | 7/2016 | Enders | B62D 21/152 |
| 9,821,852 B2 | * | 11/2017 | Akhlaque-e-rasul | B60K 1/04 |
| 9,834,255 B2 | * | 12/2017 | Chung | B62D 25/20 |

(Continued)

FOREIGN PATENT DOCUMENTS

| | | | | |
|---|---|---|---|---|
| GB | 954249 A | * | 4/1964 | B65G 47/29 |
| JP | 2007125974 A | * | 5/2007 | B62D 21/157 |

(Continued)

*Primary Examiner* — Nicole T Verley
(74) *Attorney, Agent, or Firm* — Brooks Kushman P.C.

(57) ABSTRACT

An inflatable tunnel reinforcement for reinforcing a vehicle tunnel structure includes a first wall, a second wall, and at least one fold connecting the first and second walls. The inflatable tunnel reinforcement further includes an inflator adapted to increase a gas pressure between the first and second walls. In an inflated configuration, the inflatable tunnel reinforcement forms a continuous load path between interior walls of the tunnel structure generally orthogonal to a longitudinal axis of the tunnel structure.

11 Claims, 3 Drawing Sheets

(56) References Cited

U.S. PATENT DOCUMENTS

| | | | |
|---|---|---|---|
| 9,896,131 B2 * | 2/2018 | Onishi | B62D 21/157 |
| 10,065,586 B2 * | 9/2018 | Barbat | B60R 19/00 |
| 2010/0187864 A1 * | 7/2010 | Tsuchida | B62D 25/20 |
| | | | 296/193.07 |
| 2017/0057549 A1 * | 3/2017 | Saeki | B62D 25/2036 |

FOREIGN PATENT DOCUMENTS

| | | | | |
|---|---|---|---|---|
| JP | 2017043155 A | * | 3/2017 | B62D 25/2036 |
| WO | WO-2015025101 A1 | * | 2/2015 | B62D 25/20 |

* cited by examiner

US 10,252,751 B2

INFLATABLE TUNNEL REINFORCEMENT

TECHNICAL FIELD

This disclosure relates to a vehicle impact response, and more particularly, to an inflatable tunnel reinforcement system.

BACKGROUND

Many vehicle body structures include underbody assemblies having a centrally-formed tunnel or passage that extends along the long axis of the vehicle. Various components, such as a driveshaft or conduits may extend through the tunnel.

Vehicle body structures may experience lateral loads, for example, during a side impact. Lateral impact loads may be transferred to the tunnel.

SUMMARY

A vehicle defines a longitudinal axis extending from a front of the vehicle to a rear of the vehicle. The vehicle includes at least one impact sensor and a controller in communication with the at least one impact sensor. The controller may be adapted to receive an indication of an impact event. The indication of an impact event may be, for example, an indication of a side impact event indicative of a load in a direction generally orthogonal to the longitudinal axis of the vehicle The vehicle further includes an underbody assembly that includes a floor pan. The floor pan includes a tunnel extending substantially parallel to the longitudinal axis of the vehicle. The tunnel includes interior walls that define a tunnel cavity.

The vehicle further includes an inflatable tunnel reinforcement system disposed in the tunnel cavity. The inflatable tunnel reinforcement system is adapted to receive a command from the controller. The inflatable tunnel reinforcement system includes a first metal wall secured to at least one interior wall of the tunnel and a second metal wall secured to the first metal wall. The first metal wall may be secured to the at least one interior wall of the tunnel through an adhesive disposed between the at least one interior wall and the first metal wall. The first metal wall may also, or instead, be secured to the at least one interior wall of the tunnel through a weld between the at least one interior wall and a flange extending from the first metal wall.

The inflatable tunnel reinforcement system further includes at least one fold disposed between the first and second metal walls at a periphery of the first and second metal walls. The first metal wall, the second metal wall, and the at least one fold define a closed interior cavity. The inflatable tunnel reinforcement system further includes an inflator disposed between the first and second metal walls. The inflator is adapted to increase a gas pressure within the closed interior cavity to inflate the inflatable tunnel reinforcement system.

In an inflated configuration, the inflatable tunnel reinforcement system forms a continuous load path between the interior walls of the tunnel generally orthogonal to the longitudinal axis of the vehicle.

In one approach, the vehicle further includes a driveshaft extending within the tunnel cavity substantially parallel to the longitudinal axis of the vehicle. The inflatable tunnel reinforcement system may be disposed about a periphery of the driveshaft, and may be disposed in spaced relation with the driveshaft when in an uninflated configuration.

In the inflated configuration, the inflatable tunnel reinforcement system may form a first continuous load path in a first plane above the driveshaft. Also in the inflated configuration, the inflatable tunnel reinforcement system and the driveshaft may form a second continuous load path in a second plane passing through the driveshaft.

A method for laterally reinforcing a longitudinally-extending tunnel structure disposed at an underbody of a vehicle includes, at a controller, receiving an indication of a side impact condition. In response, the method includes inflating an inflatable tunnel reinforcement system disposed within the longitudinally-extending tunnel structure to increase an interior volume of the inflatable tunnel reinforcement system to form a continuous load path between interior walls of the tunnel structure and generally orthogonal to the longitudinally-extending tunnel structure.

Inflating the inflatable tunnel reinforcement system may engage the inflatable tunnel reinforcement system with a longitudinally-extending driveshaft disposed within the longitudinally-extending tunnel structure. Inflating the inflatable tunnel reinforcement system may also include increasing a closed interior volume disposed between a first wall and a second wall. The first and second walls may be formed, for example, of metal. Inflating the inflatable tunnel reinforcement system may also include inflating to an air pressure of approximately 100 psi.

An inflatable tunnel reinforcement for reinforcing a vehicle tunnel structure includes a first wall, a second wall, and at least one fold connecting the first and second walls. The inflatable tunnel reinforcement further includes an inflator adapted to increase a gas pressure between the first and second walls. In an inflated configuration, the inflatable tunnel reinforcement forms a continuous load path between interior walls of the tunnel structure generally orthogonal to a longitudinal axis of the tunnel structure.

At least one of the first wall and the second wall is secured to at least one interior wall of the tunnel structure. In one approach, the first and second walls are formed of metal, and may be formed by additive manufacturing. In another approach, the first and second walls are formed of metal, and may be welded at outer peripheries of the first and second walls. In another approach, the first and second walls are formed of a thermoplastic.

The at least one fold may be a plurality of folds extending in a continuous Z-fold configuration. In one approach, the at least one fold is formed in at least one of the first wall and the second wall. In another approach, the at least one fold is formed in a third wall secured to the first wall and the second wall.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
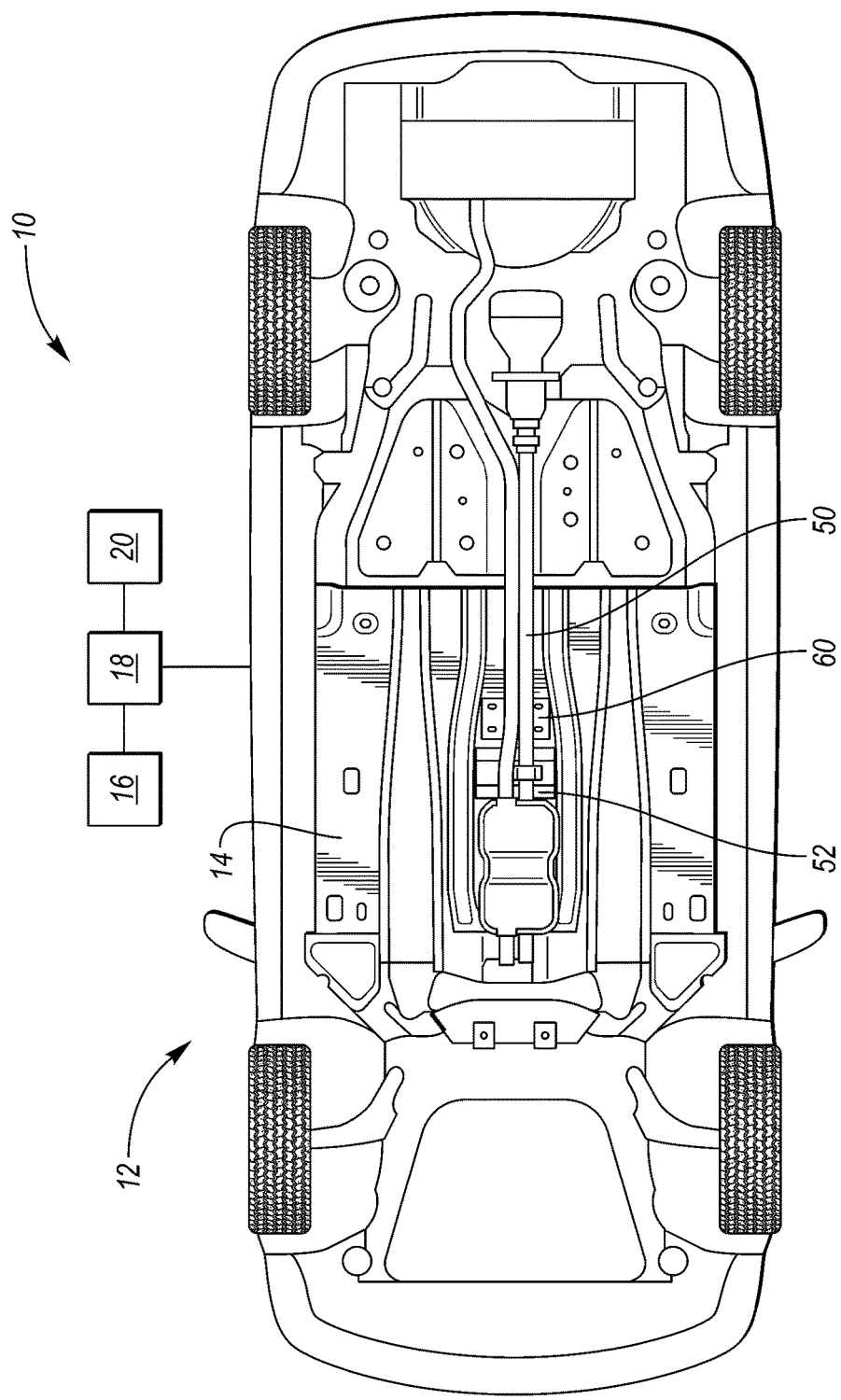
FIG. 1 is a bottom plan view of a vehicle.

Referring now to FIG. 1, a vehicle 10 includes an underbody assembly 12 having various structural components. The underbody assembly 12 of the vehicle 10 is a portion of the vehicle frame that spans longitudinally between a front end of the vehicle 10 and a rear end of the vehicle 10.

In many configurations, the underbody assembly 12 includes a floor pan 14. The floor pan 14 may be formed, for example, of a metal material such as sheet metal. The floor pan 14 may include one or more lateral regions and one or more tunnels. For example, the floor pan 14 may include two generally planar lateral regions and a tunnel disposed between the lateral regions. In some approaches, the lateral regions and the tunnel are integrally formed. In other approaches, the lateral regions and the tunnel are separately formed and assembled into a floor pan assembly.

The vehicle 10 may be provided with one or more impact sensors 16, shown schematically in FIG. 1. The impact sensors 16 are adapted to detect an actual or impending collision event. The impact sensors 16 may include, for example, a side impact sensor, and may be in the form of acceleration sensors or any other suitable form of sensor. The impact sensors incorporated within the vehicle 10 may operate to generate and transmit impact signals.

The vehicle 10 may further include an electronic control module (ECM) 18. The ECM 18 may be disposed at a center console of the vehicle and may, for example, be a Restraint Control Module. The ECM 18 may be in electrical communication with one or more impact sensors 16. The ECM 18 may operate to receive the impact signals and to determine whether the vehicle 10 has been involved in, for example, a frontal impact, side impact, or roll-over crash. In this way, the ECM 18 may receive an indication of an impact event, which may be an impending impact or an experienced impact.

The vehicle 10 may further include one or more impact response systems 20. For example, passive restraint systems such as air bags or automatic seat belt tensioners may automatically activate in the event of an activation worthy impact event. Impact safety systems 20 may take other forms, such as vehicle structural integrity systems, as discussed in greater detail elsewhere herein. The ECM 18 may be in electrical communication with one or more impact response systems 20. For example, once a type of impact is determined, the ECM 18 may control one or more impact response systems 20.

Figure 2:
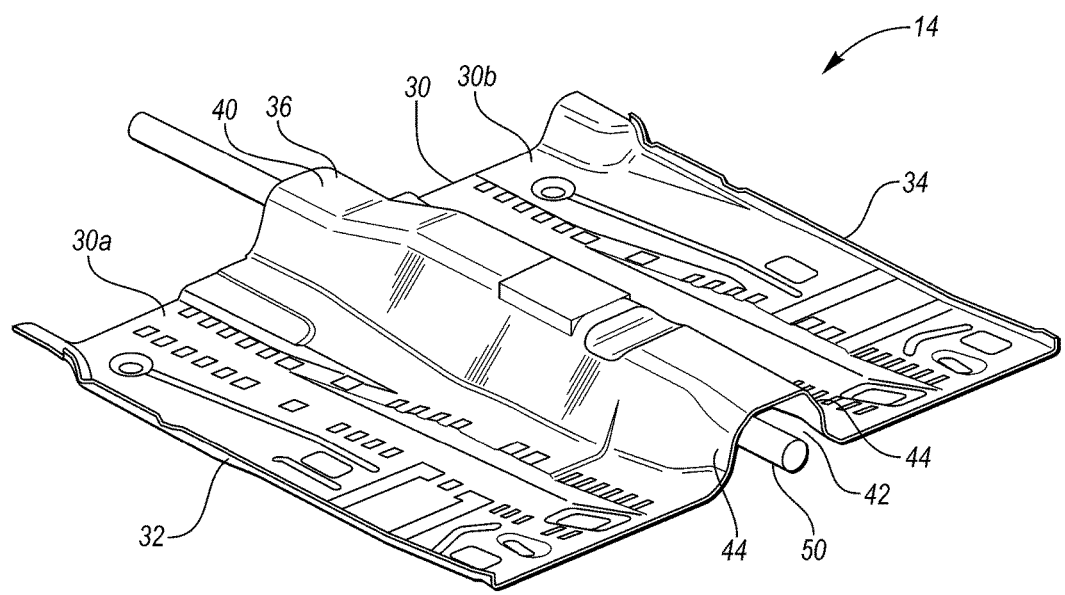
FIG. 2 is a top perspective view of a floor pan for a vehicle underbody.

As shown in FIG. 2, a top surface of the floor pan 14 is defined by a floor panel 30 that extends laterally between the first and second longitudinal end regions 32, 34 to provide a support surface for an occupant within the vehicle 10. The floor panel 30 may include lateral floor panel sections 30a, 30b. It is understood that the floor panel 30 may be a single integral piece or a number of separate pieces that together form the support surface of the vehicle floor. The support surface may also conceivably be used to support interior components of the vehicle 10 such as seating assemblies, a center console, an instrument panel, and other interior components, as generally understood by one having ordinary skill in the art.

The floor panel 30 includes a raised central area 36 between the lateral floor panel sections 30a, 30b. The raised central area 36 defines an upper region of a tunnel 40 that generally extends longitudinally in the direction of the length of the vehicle 10. In many approaches, the tunnel 40 extends along a generally central longitudinal axis of the vehicle 10. The tunnel 40 has a tunnel height generally defined, for example, by the height of tunnel walls 44 that extend from the floor panel 30 to the raised central area 36 in the direction of the interior of the vehicle 10. In this way, the tunnel 40 defines a tunnel cavity 42.

Various components may be disposed within the tunnel cavity 42. For example, a driveshaft 50 extend within the tunnel 40 along the longitudinal axis of the tunnel. The driveshaft 50 operates to transfer rotational power to the rear set of wheels when an engine is located in the front portion of the vehicle 10, and likewise, may be used to transmit rotational power to the front set of wheels when the engine of the vehicle 10 is located in a rear portion of the vehicle 10. With reference momentarily to FIG. 1, the driveshaft 50 may be support by a support mount 52 disposed within the tunnel cavity 42.

Other components typically associated with the underbody of the vehicle 10 may be disposed in the tunnel 40. For example, electrical or fluid conduits (e.g., exhaust pipes) may also be disposed in the tunnel 40.

During a side impact, the vehicle body structure, including the floor pan 14, may absorb energy in the lateral direction. In many instances, a side impact may cause the tunnel 40 to crush in the lateral direction, thereby moving a first lateral floor panel section (e.g., lateral floor panel section 30a) into contact with a second lateral floor panel section (e.g., lateral floor panel section 30b).

Figure 3:
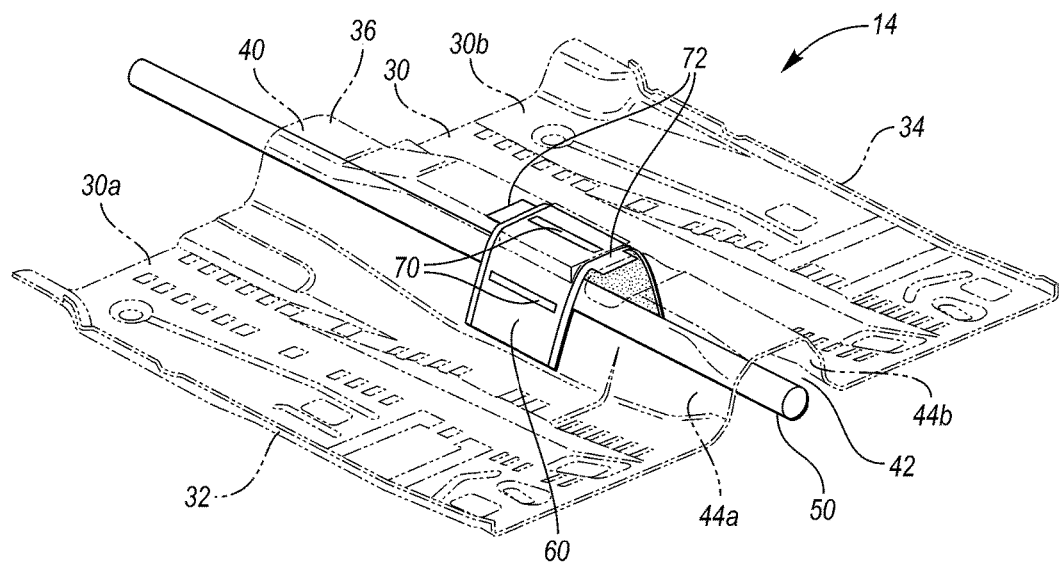
FIG. 3 is a top perspective view of a floor pan for a vehicle underbody showing an inflatable tunnel reinforcement system.

Referring now to FIG. 3, the vehicle 10 may be provided with an inflatable tunnel reinforcement system (ITRS) 60. The ITRS 60 may also be referred to as an inflatable tunnel reinforcement structure or an inflatable tunnel reinforcement assembly.

The ITRS 60 may be formed of any suitable material adapted for rapid inflation. In one approach, the ITRS 60 is substantially formed from one or more components. The components may be formed using additive fabrication technologies such as 3D printing. Types of additive manufacturing processes known in the art include stereolithography apparatuses (SLA), 3D sandprinting, and other three-dimensional printers, ink jet printers that bond layers of powder material, plastic compositions using a bonding solvent, metallic based powders using a laser sintering device, and many other such processes known in the art that will be appreciated by one skilled in the art. Thus, any such process may be suitable in conjunction with the present invention in creating a sacrificial pattern part of a die component or a sacrificial mold for a die component without departing from the spirit of the present invention.

In another approach, the ITRS 60 may be formed from pre-formed components. The components may be one or more sheets of metal (for example, a ductile metal such as low grade steel). The components may also be one or more sheets of plastic (for example, a thermoplastic having a high degree of elongation before failure). The components may also be one or more sheets of fabric. The components may be discrete components secured to one another using any suitable approach. For example, when the discrete components are sheets of metal, the sheets may be welded together.

Figure 4:
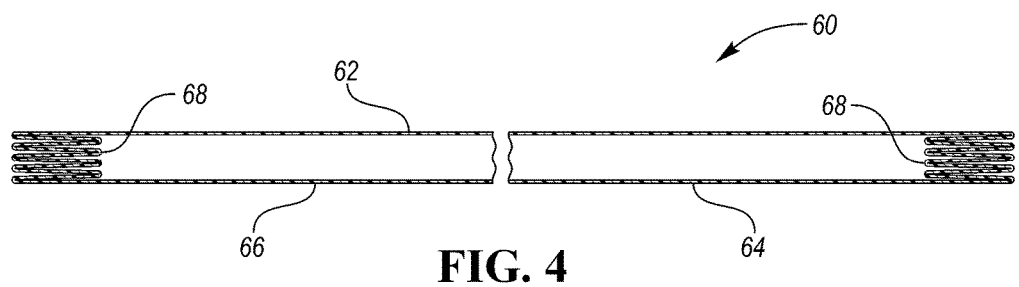
FIG. 4 is an illustration of an inflatable tunnel reinforcement system having an example fold configuration.

Referring now to FIG. 4, the one or more components of the ITRS 60 form a closed interior cavity. The ITRS 60 may define a first wall 62 and a second wall 64, and a closed interior cavity 66 between the first and second walls 62, 64. At least one fold 68 is disposed in a fold region between the first and second walls 62, 64, for example, at a periphery of the ITRS 60. The at least one fold may be formed in the first wall 62, the second wall 64, or in both the first and second walls 62, 64. In another approach, the at least one fold is formed in an intermediate webbed portion disposed between the first and second walls 62, 64 to define a closed interior cavity between the first and second walls 62, 64.

The at least one fold may take the form of a V-fold in which material is folded over at a hinge region. In one approach, the at least one fold is a single fold about a single hinge. In another approach, the at least one fold is a plurality of folds about respective hinges. In this approach, the plurality of folds for a Z-fold or continuous Z-folds, as shown in FIG. 4. Other folding schemes may include to inboard or outboard rolls, single or double rolls, compression folds, and plus-one lateral or longitudinal folds.

The ITRS 60 may be suitably sized such that the ITRS 60, upon inflation, fills an entire cross section of a tunnel cavity (e.g., tunnel cavity 42) along the lateral direction that was not previously filled. The ITRS 60 may be provided with any suitable longtiduinal length. For example, the ITRS 60 may have a longitudinal length of between one and five inches, of approximately six inches, of approximately 12 inches, or more than 12 inches.

The ITRS 60 may be disposed in locations susceptible to high lateral loads. In one approach, the ITRS 60 is disposed within the tunnel cavity 42 at a longitudinal location of the vehicle proximate the "B" pillar. In another approach, the ITRS 60 is disposed within the tunnel cavity 42 proximate front seats of the vehicle 10. In another approach, the ITRS 60 is disposed within the tunnel cavity 42 proximate the rear seats of the vehicle 10. In another approach, the ITRS 60 is disposed within the tunnel cavity 42 proximate the fuel tank of the vehicle 10.

In one approach, a single ITRS 60 is provided. In another approach, more than one ITRS 60 is provided. For example, a first ITRS may be longitudinally spaced from a second ITRS within the same tunnel cavity 42. In another examples, a first ITRS may be provided in a first tunnel cavity, and a second ITRS may be provided in a second tunnel cavity.

Furthermore, in addition to longitudinally extending tunnels, laterally extending tunnels (such as half shaft tunnels) may also be provided with an ITRS. It is expressly contemplated that other regions of the vehicle, including other cavities within the vehicle underbody 12, may be provided with one or more ITRS.

Referring again to FIG. 3, the ITRS 60 may be disposed within the tunnel cavity 42 such that the ITRS 60 does not interfere with other components (e.g., driveshaft 50) disposed within the tunnel cavity 42 when the ITRS 60 is in the uninflated configuration.

The ITRS 60 may be disposed within the tunnel cavity 42 such that at least a portion of the ITRS 60 is disposed at least on opposing, laterally spaced walls 44 defining the tunnel cavity 42. In other approaches, the ITRS is disposed on only one wall. In other approaches, a first ITRS is disposed on a first wall, and a second ITRS is disposed on a second opposing, laterally spaced wall. In still other approaches, the ITRS is disposed on bottom wall of the raised central area 36. The walls defining the tunnel cavity may be vertical walls, substantially vertical walls, angled walls, or rounded walls.

The ITRS 60 may be secured to interior walls of the tunnel 40 within the tunnel cavity 42. More specifically, a top surface of the first wall 62 may be secured to the interior walls of the tunnel 40, for example, using adhesive. The adhesive may be, for example, in the form of one or more adhesive patches 70. The ITRS 60 may also or instead be secured to the interior walls of the tunnel 40 using other suitable attachment approaches, such as through welding or use of mechanical fasteners.

In some approaches, the ITRS 60 may include one or more flaps or flanges 72 for securing the ITRS 60 to the interior walls of the tunnel 40. The flanges 72 may extend, for example, from the first wall 62 and may extend along the interior walls of the tunnel 40. The flanges 72 may be secured to the interior walls of the tunnel 40. For example, the flanges 72 may be welded to the interior walls of the tunnel 40, or may be secured to the tunnel 40 using adhesive, one or more mechanical fasteners, or any other suitable approach for securing the flanges 72 to the tunnel 40.

Figure 5:
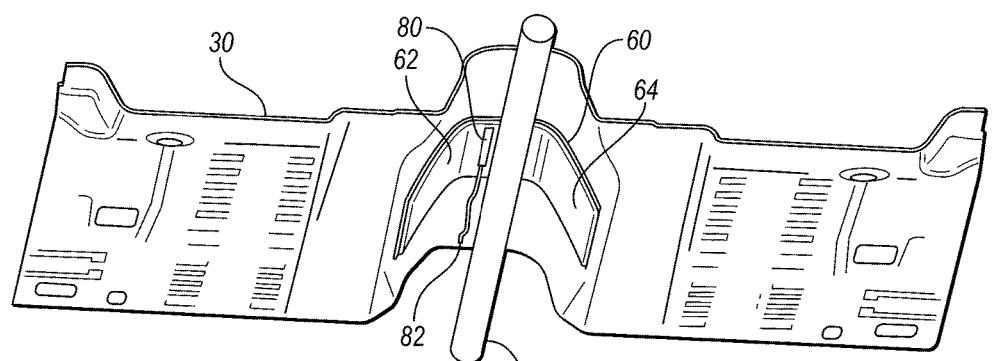
FIG. 5 is a bottom perspective view of the floor pan showing an inflatable tunnel reinforcement system.

Referring now to FIG. 5, an inflator 80 may be provided to inflate the ITRS 60. In one approach, the inflator is disposed between the first and second walls 62, 64, for example, prior to forming the closed interior cavity between the first and second walls 62, 64. In another approach, the inflator 80 is secured to an exterior surface of the ITRS 60 (for example, at the second wall 64) and may include a fill tube for permitting fluid communication with the closed interior cavity.

The inflator 80 is provided in electrical communication with a power source via a communication line 82. In one approach, the power source is a vehicle battery system. In another approach, the power source is a dedicated battery system. The power source is adapted to communicate an electrical current to the inflator 80, for example, in response to a command from the ECM 18.

Figure 6:
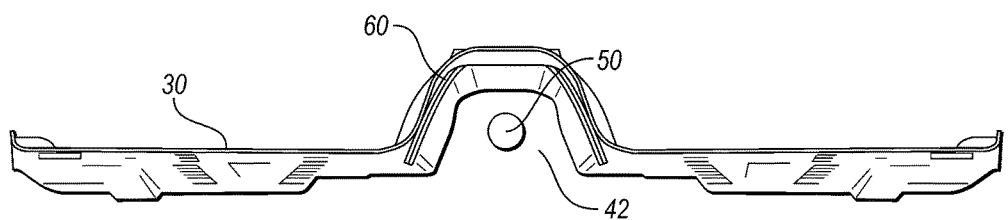
FIG. 6 is a side elevation view of the floor pan showing the inflatable tunnel reinforcement system in a first configuration.

The ITRS 60 may be inflated in response to a command from the ECM 18, which command may be issued in response to the ECM 18 receiving an indication of an impact (e.g., a side impact) from one or more sensors 16. In response to receiving the command from the ECM 18, the inflator 80 is adapted to inflate the ITRS 60 from an uninflated configuration, shown in FIGS. 3, 5 and 6, to a partially inflated configuration, and to a fully inflated configuration. In this way, the closed interior cavity may define a first volume when the ITRS 60 is in the uninflated configuration, a second volume when the ITRS 60 is in a partially inflated configuration, and a third volume when the ITRS 60 is in the fully inflated configuration.

During inflation, the inflator 80 injects gas into the closed interior cavity 66 between the first and second walls 62, 64. The one or more folds 68 unfold as the second wall 64 is separated from the first wall 62 due to the gas pressure. Gas is preferably injected at a rate sufficient to at least partially inflate the ITRS 60 before lateral forces cause the tunnel 40 to collapse. In one approach, gas is injected to inflate the ITRS 60 to a pressure of 100 psi. Other suitable inflation pressures are contemplated.

Figure 7:
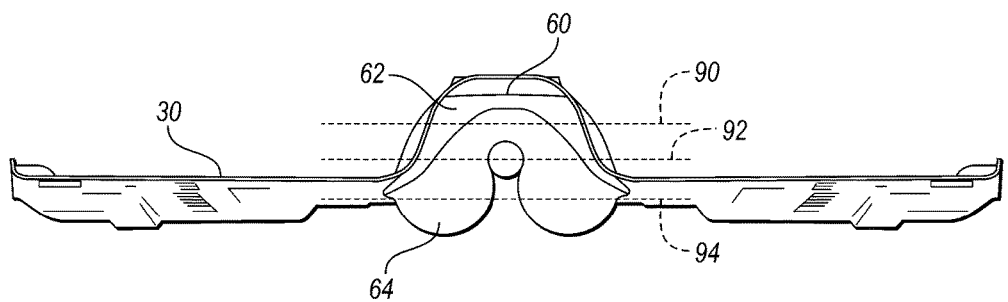
FIG. 7 is a side elevation view of the floor pan showing the inflatable tunnel reinforcement system in a second configuration.

The inflated ITRS 60 may contact an interior component (e.g., driveshaft 50) at an upper surface of the component, at lateral side surfaces of the component, or at both the upper surface and lateral side surfaces of the component, as shown for example in FIG. 7. The ITRS 60 may also be inflated such that it entirely surrounds the component.

In the inflated configuration, the ITRS 60 preferably fills an entire cross section of the tunnel cavity 42 along the lateral direction that was not previously filled. For example, when the ITRS 60 is disposed so as to surround a component such as a driveshaft 50, the inflated ITRS 60 may fill an entire cross section of the tunnel cavity 42 along a first plane 90 extending in the lateral direction, wherein the first plane is disposed above the driveshaft 50. The inflated ITRS 60 and the driveshaft 50 may together fill an entire cross section of the tunnel cavity 42 along a second plane 92 extending in the lateral direction, wherein the second plane extends through the driveshaft 50. In one approach, the ITRS 60 may be inflated such that it does not fill an entire cross section of the tunnel cavity 42 along a third plane 94 extending in the lateral direction, wherein the third plane is disposed below the driveshaft 50. In another approach, the ITRS 60 may be inflated such that it does fill an entire cross section of the tunnel cavity 42 along the third plane 94.

In this way, the ITRS 60 forms one or more continuous load paths between walls of the tunnel 40 when in the inflated configuration. More particularly, in the inflated configuration, the ITRS 60 forms a continuous lateral load path between interior walls of the tunnel, wherein the lateral load path extends orthogonal to a longitudinal axis of the tunnel 40 (or another longitudinal axis of the vehicle 10). Thus, lateral loads received at a first vertical wall of the tunnel (e.g., the vertical wall disposed at a side of the vehicle 10 receiving a side impact) may be transferred to the ITRS 60, which transfers the load to the opposite vertical wall (including, in some approaches, through a component such as a driveshaft 50 disposed in the tunnel 40). In this way, lateral loads may be transferred through an underbody 12 component (e.g., floor pan 14) of the vehicle 10. The ITRS materials (e.g., the materials of the first and second walls 62, 64) as well as the air pressure may be selected such that, in the inflated configuration, the ITRS 60 substantially maintains a first wall (e.g., wall 44a shown in FIG. 3) of the tunnel 40 in spaced relation from a second wall (e.g., wall 44b) at the location of the ITRS 60.

As described herein, the ITRS 60 may be an impact safety system 20 adapted to transfer lateral load during a side impact, and may reduce the likelihood of a tunnel structure of a vehicle underbody assembly for collapsing during side impact. The ITRS 60 may also reduce the likelihood of a vehicle occupant-to-occupant collision during side impact. The ITRS 60 may be installed in place of, or in addition to, other braces disposed in the tunnel to reinforce the tunnel in the lateral direction. Furthermore, the ITRS 60 may be include mounts, brackets, or other structural components for engagement with one or more components in the underbody 12 of the vehicle 10. For example, the ITRS 60 may be provided with a mounting support for supporting the driveshaft 50 within the tunnel 40.

While exemplary embodiments are described above, it is not intended that these embodiments describe all possible forms encompassed by the claims. The words used in the specification are words of description rather than limitation, and it is understood that various changes may be made without departing from the spirit and scope of the disclosure. As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. A vehicle defining a longitudinal axis extending from a front of the vehicle to a rear of the vehicle, the vehicle comprising:
   at least one impact sensor;
   a controller in communication with the at least one impact sensor and adapted to receive an indication of an impact event;
   an underbody assembly including a floor pan, wherein the floor pan includes a tunnel extending substantially parallel to the longitudinal axis of the vehicle, and wherein the tunnel includes interior walls that define a tunnel cavity;
   a driveshaft extending within the tunnel cavity substantially parallel to the longitudinal axis of the vehicle; and
   an inflatable tunnel reinforcement system disposed in the tunnel cavity, wherein the inflatable tunnel reinforcement system is adapted to receive a command from the controller, and wherein the inflatable tunnel reinforcement system includes
      a first metal wall secured to at least one interior wall of the tunnel,
      a second metal wall secured to the first metal wall,
      at least one fold disposed between the first and second metal walls at a periphery of the first and second metal walls, wherein the first metal wall, the second metal wall, and the at least one fold define a closed interior cavity, and
      an inflator disposed between the first and second metal walls and adapted to increase a gas pressure within the closed interior cavity to inflate the inflatable tunnel reinforcement system;
   wherein in an inflated configuration, the inflatable tunnel reinforcement system forms a continuous load path between the interior walls of the tunnel generally orthogonal to the longitudinal axis of the vehicle.

2. The vehicle of claim 1, wherein the inflatable tunnel reinforcement system is disposed about a periphery of the driveshaft, and is disposed in spaced relation with the driveshaft when in an uninflated configuration.

3. The vehicle of claim 1, wherein in the inflated configuration, the inflatable tunnel reinforcement system forms a first continuous load path in a first plane above the driveshaft.

4. The vehicle of claim 3, wherein in the inflated configuration, the inflatable tunnel reinforcement system and the driveshaft form a second continuous load path in a second plane passing through the driveshaft.

5. The vehicle of claim 1, wherein the indication of an impact event is an indication of a side impact event indicative of a load in a direction generally orthogonal to the longitudinal axis of the vehicle.

6. The vehicle of claim 1, wherein the first metal wall is secured to the at least one interior wall of the tunnel through at least one of:
   an adhesive disposed between the at least one interior wall and the first metal wall; and
   a weld between the at least one interior wall and a flange extending from the first metal wall.

7. A method for laterally reinforcing a longitudinally-extending tunnel structure disposed at an underbody of a vehicle, comprising:
   at a controller, receiving an indication of a side impact condition; and
   in response, inflating an inflatable tunnel reinforcement disposed within the longitudinally-extending tunnel structure to increase an interior volume of the inflatable tunnel reinforcement to form a continuous load path between interior walls of the tunnel structure and generally orthogonal to the longitudinally-extending tunnel structure, wherein inflating the inflatable tunnel reinforcement engages the inflatable tunnel reinforcement system with a longitudinally-extending driveshaft disposed within the longitudinally-extending tunnel structure.

8. The method of claim 7, wherein inflating the inflatable tunnel reinforcement includes inflating to an air pressure of approximately 100 psi.

9. The method of claim 7, wherein inflating the inflatable tunnel reinforcement includes increasing a closed interior volume disposed between a first wall and a second wall.

10. The method of claim 9, wherein the first and second walls are formed of metal.

11. A method for laterally reinforcing an underbody of a vehicle, comprising:
   at a controller, receiving an indication of a side impact condition; and
   in response, inflating an inflatable tunnel reinforcement disposed within a longitudinally-extending tunnel structure at the underbody into engagement with a longitudinally-extending and rotatable driveshaft, disposed within the tunnel structure and adapted to transmit rotational power, thereby forming a continuous load path between interior walls of the tunnel structure and the driveshaft.

* * * * *